United States Patent [19]

Beckmeyer et al.

[11] Patent Number: 5,753,581
[45] Date of Patent: May 19, 1998

[54] METHOD OF ASSOCIATING PRECIOUS METALS WITH SPECIFIC OXIDES IN MIXED OXIDE SYSTEMS FOR USE AS CATALYSTS

[75] Inventors: Richard Frederick Beckmeyer, Clarkston; Jeffrey Alan Shunkwiler, Grand Blanc; William John La Barge, Bay City, all of Mich.

[73] Assignee: General Motor Corporation, Detroit, Mich.

[21] Appl. No.: 579,027

[22] Filed: Dec. 18, 1995

[51] Int. Cl.⁶ .................................. B01J 23/10
[52] U.S. Cl. ............... 502/304; 502/327; 502/334; 502/335; 502/359
[58] Field of Search ........................ 502/304, 327, 502/334, 335, 339

[56] References Cited

U.S. PATENT DOCUMENTS

| | | | |
|---|---|---|---|
| 4,753,915 | 6/1988 | Vogt et al. | 502/304 |
| 4,904,633 | 2/1990 | Ohata et al. | 502/304 |
| 5,073,532 | 12/1991 | Domesle et al. | 502/304 |

Primary Examiner—Shrive P. Beck
Assistant Examiner—Timothy Meeks
Attorney, Agent, or Firm—Cary W. Brooks

[57] ABSTRACT

This invention provides a very low cost effective method to alter the association of precious metal catalysts with specific support oxides in mixed oxide systems. The invention includes two discoveries: 1) that the isoelectric points for the three normally-used gasoline catalyst components are significantly different and the surface charges present have significant magnitude to promote attraction and repulsion of ions or charged radicals; and 2) ammine-chloride or ammine-nitrate salts both dissociate into positively charged precious metal radicals and are stable over a very wide pH range. The pH of the impregnation solution is controlled such that the surface charge of the oxide is opposite to the charge on the precious metal radical if the metal is to be supported on that oxide, and to control the pH such that all charges on the oxide to be avoided are the same as the precious metal radical.

10 Claims, 6 Drawing Sheets

METHOD OF ASSOCIATING PRECIOUS METALS WITH SPECIFIC OXIDES IN MIXED OXIDE SYSTEMS FOR USE AS CATALYSTS

FIELD OF THE INVENTION

This invention relates to a method of associating precious metals with specific oxides in mixed oxide systems for use as catalysts, and more particularly for use as gasoline catalysts.

BACKGROUND

Catalysts with mixed oxides where multiple metals are associated with specific oxides have been made and tested with limited success. They are made by first making, for example, Pt on alumina as a powder. This is done by slurrying the alumina and a precious metal salt together, and then drying and heating the material to decompose the salt so it will remain associated with the oxide when it is re-slurried. Then, for example, a Rh salt could be slurried with ceria, drying and heating so as to decompose the Rh salt on the ceria. Generally NiO is also used in these catalysts to suppress $H_2S$ formations, but it is of no advantage to support any precious metals on the NiO. In fact, it is probably best to isolate the metals from the Nio, as they will quickly become deactivated. The above steps can be used to make a washcoat containing Pt/alumina, Rh/ceria, and NiO. It can then be applied to a monolith and dried with an optional final calcination.

Although the goal of associating specific metals with specific oxides has been met, making a catalyst by this method is both costly and ineffective. It is costly because of the number of process steps and the handling of materials with precious metals associated with them very early in the process and thus subject to losses at each step. It is ineffective because many of the active metals become buried within the washcoat near the monolith. Other layers of particles on top of the active metals block contact of the exhaust with the active metals.

The present invention provides advantages over the prior art.

SUMMARY OF THE INVENTION

This invention provides a very low cost effective method to alter the association of precious metal catalysts with specific support oxides in mixed oxide systems. The invention includes two discoveries: 1) that the isoelectric points for the three normally-used gasoline catalyst components are significantly different and the surface charges present are of significant magnitude to promote attraction and repulsion of ions or charged radicals; and 2) ammine-chloride or ammine-nitrate salts both dissociate into positively charged precious metal radicals and are stable over a very wide pH range. The pH of the impregnation solution is controlled such that the surface charge of the oxide is opposite to the charge on the precious metal radical if the metal is to be supported on that oxide, and to control the pH such that all charges on the oxide to be avoided are the same as the precious metal radical.

These and other objects, features and advantages will be apparent from the following brief description of the drawings, detailed description and appended claims and drawings.

DETAILED DESCRIPTION

Figure 1:
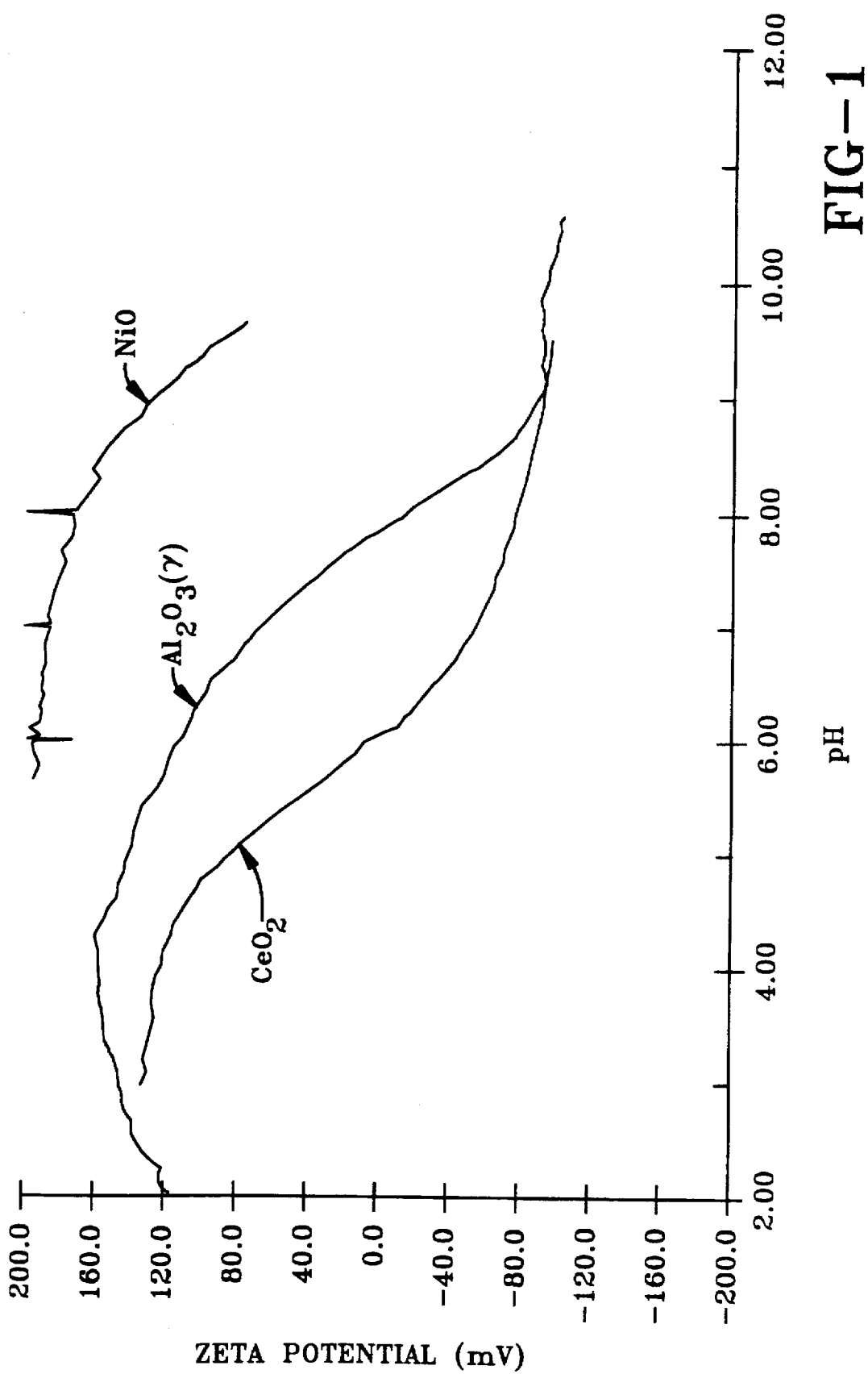
FIG. 1 is a graph of zeta potential (a measure of surface charge) versus pH for alumina, ceria, and nickel oxide.

There are many reasons for making catalysts with mixed oxide supports. Some oxides, such as alumina, have high surface areas which are stable at high temperatures and therefore are excellent supports to promote an initial fine dispersion of the active metal and to maintain this good dispersion even after high temperature conditions have been experienced. Some other oxides have multiple functions in a catalyst. For instance, titania, zirconia, and rare earth materials such as ceria and lanthana act not only to disperse precious metal with their high and stable surface area, but also store and release oxygen to make the catalyst more effective over a wider air/fuel ratio. There also may be many reasons for associating a mixture of precious metals to be supported on the oxides such that specific metals are associated with specific oxides. One deactivation mechanism of gasoline catalysts which has been proposed is rhodium aluminate formation which occurs when Rh is supported on alumina. Since ceria is required to be present for its multiple functions anyway, it may be more advantageous to support the Rh on the ceria. There are no known detrimental interactions which could deactivate the catalyst performance between ceria and Rh.

The present invention provides a very cost effective method to alter the association of precious metal catalysts with specific support oxides in mixed oxide systems. First, the isoelectric points of the three normally-used gasoline catalyst components are significantly different and the surface charges present are of significant magnitude to promote attraction or repulsion of ions or charged radicals. Second, ammine-chloride and ammine-nitrate salts both dissociate into positively charged precious metal radicals and are stable over a very wide pH range.

The present invention provides for a selective post-impregnation of the precious metals to the washcoated catalyst. This results in the metals being supported on the required oxides and also concentrated on the washcoat surface exposed to the exhaust.

According to the present invention the pH of the impregnation solution is controlled so that the surface charge of the oxide is opposite to the charge on the precious metal radical if the metal is to be supported on that oxide. Further, the pH is controlled so that all charges are the same sign for the oxide where the metals are not wanted.

The isoelectric points of the typically-used oxides are: ceria=6, alumina=8–9, and NiO=10.5. Impregnating with a positively charged ion or radical at a pH around 7 will result in most of the impregnated material being associated with the ceria. This is because ceria will have a negative surface charge while the alumina and NiO will carry a positive surface charge and therefore not attract the positively charged metal radical. Alternatively, impregnation using the positively charged ion or radical at a pH between 9.5 and 10.5 will associate the metals with both the ceria and the alumina, but still keep them away from the NiO.

In the simplest application of this idea, co-impregnation of Pt and Rh using the ammine-chloride or ammine-nitrate salts at a pH around 7 results in the association of a large amount of the metals with ceria rather than alumina for better performance. However, other strategies are achievable with the present invention.

In a first strategy according to the present invention, rhodium aluminate formation should be avoided, but the alloying of Rh and Pt is critical for best performance. Also Pt/alumina is more effective for CO oxidation than Pt/ceria. Further, all metals should be kept away from NiO for optimum performance. In this case, starting with an alumina/ceria/NiO washcoated catalyst for example, we use a multiple impregnation scheme where the Pt is a positively charged ion or radical and is impregnated at a high pH (between 9.5 and 10.5) so that there is no preference for either the ceria or alumina (other than their relative pore volumes) but that surface concentration will result because of the attraction to both oxides where the precious metal solution comes into initial contact. Both alumina and ceria will be negatively charged at a pH above 9.5, while the NiO will still be positively charged up until pH=10.5. We dry and heat the catalyst to decompose the salt. Then, impregnate the Rh using a positively charged ion or radical at a pH of about 7 where the ceria is negatively charged and the alumina is positively charged. The Rh will preferentially go to the ceria, the ceria will already have Pt supported on it to allow alloying with the Rh, and a large amount of the Pt will be supported on the alumina due to its higher percentage in the composition and its higher pore volume.

In a second strategy according to the present invention, ceria is a better support for alloying Pt and Rh. In this case, again starting with an alumina/ceria/NiO washcoated catalyst, co-impregnation with positively charged ions or radicals at a pH of about 7 would be most advantageous.

In a third strategy according to the present invention, ceria provides the critical oxygen storage function, but really is an inferior support for the precious metals either for dispersion or stability reasons. Again starting with the washcoated alumina/ceria/NiO catalyst, co-impregnate with the positively charged ions or radicals at the higher pH as described above where both the ceria and alumina have positive charges. Again, a pH between 9.5 and 10.5 is preferred to keep all metals away from the NiO. Also, the use of higher pore volume alumina would force more metals to the alumina in this case. An alternate scheme would be to use a negatively charged radical and impregnate at about 7, but some of the metals would end up on the NiO by using this method.

$Pt(NH_3)_4Cl_2$ and $Rh(NH_3)_6Cl_3$ are chosen as the salts to demonstrate the present invention because they form positively charged radicals upon dissolution and are stable over a wide pH range. Preferred impregnation have the following ingredients by weight percent 0.038 T.O. Pt and 0.0038 T.O. Rh with 300 g of TECH III washcoat on a 400 CPSI 85 in.$^3$ monolith.

FIG. 1 is a graphical representation of surface charge (zeta potential) versus pH of the different oxides used in Tech III. Tech III is a standard gasoline catalyst with Pt/Rh supported on alumina-ceria. At a pH of 2 note that all the washcoat components will be positively charged. Since the PGM radicals (i.e., ammine chloride radicals) are also positively charged, there will be no attraction, and the metals when added as a wet impregnation of dissolved salts will end up distributed based on relative pore volumes of the oxides and the drying method employed. The metals always are more concentrated in areas which dry first.

At a pH of 7, however, quite a different situation exists where alumina and NiO are still positively charged, but the ceria is negatively charged causing more metals to preferentially associate with the ceria. When these catalysts were examined, it was verified that much more PGM was associated with the ceria as compared with the alumina. The expected distribution of metals at the pH 7 impregnation would be some metals distributed based on charged considerations (those associated with ceria) and other metals distributed based on pore filling and drying considerations.

At a pH of 10, the ceria and alumina are now oppositely (negatively) charged, and the expected distribution would now be very surface concentrated and distributed over both the ceria and the alumina, as the majority of the pore filling and drying considerations would be overcome. Another possible advantage of utilizing this technique would be that no metals would associate with NiO as it is still positively charged. This was not verified, but PGM's on NiO are thought to be wasted and very inactive catalytically.

Figure 2:
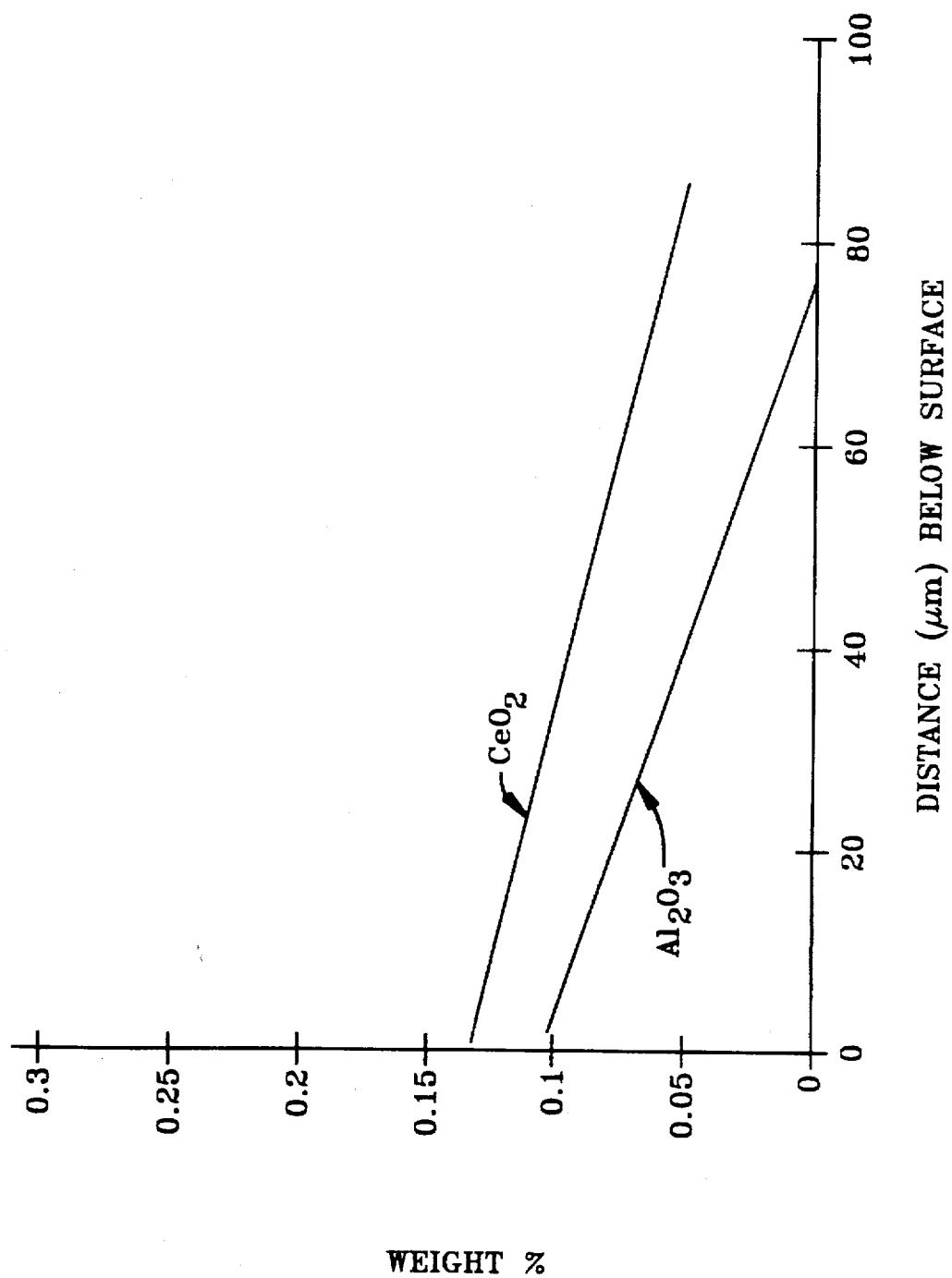
FIG. 2 illustrates the results of a microprobe analysis at pH=2 of the present invention.

Characterization of the concentration of PGM's resulting from impregnation at pH=2 in the corner section of cells of the substrate through the thickness of the washcoat shows a very low concentration with a slight gradient of higher concentration toward the surface which is caused by drying in our standard process. The thin section of the washcoat dries first, the surface of the corner dries next, the area near the substrate dries next (due to the high porosity of the substrate pulling water out of the washcoat), and finally the center of the washcoat in the corners dries last. Also, a dark stripe is seen visually on the thin section surface (which has been verified to be heavy PGM concentration). Most of the metals go to the thin section which dries first, leaving very little PGM's in the corner areas. This results in poor metal distribution. FIG. 2 illustrate the results of a microprobe analysis at pH=2 in the corner.

Figure 3:
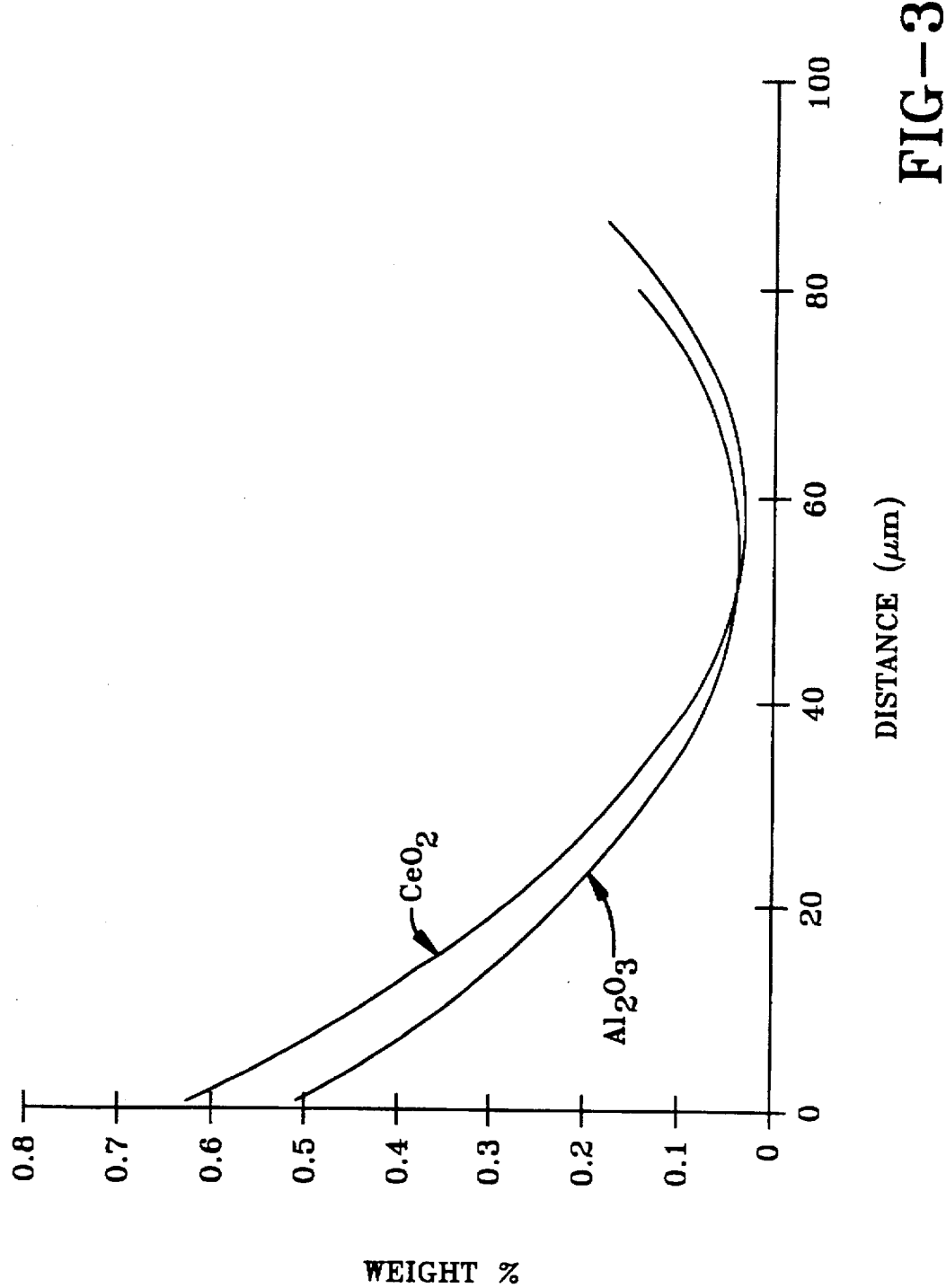
FIG. 3 illustrates a microprobe analysis at pH=7 impregnation in the cell corner of the present invention.
Figure 4:
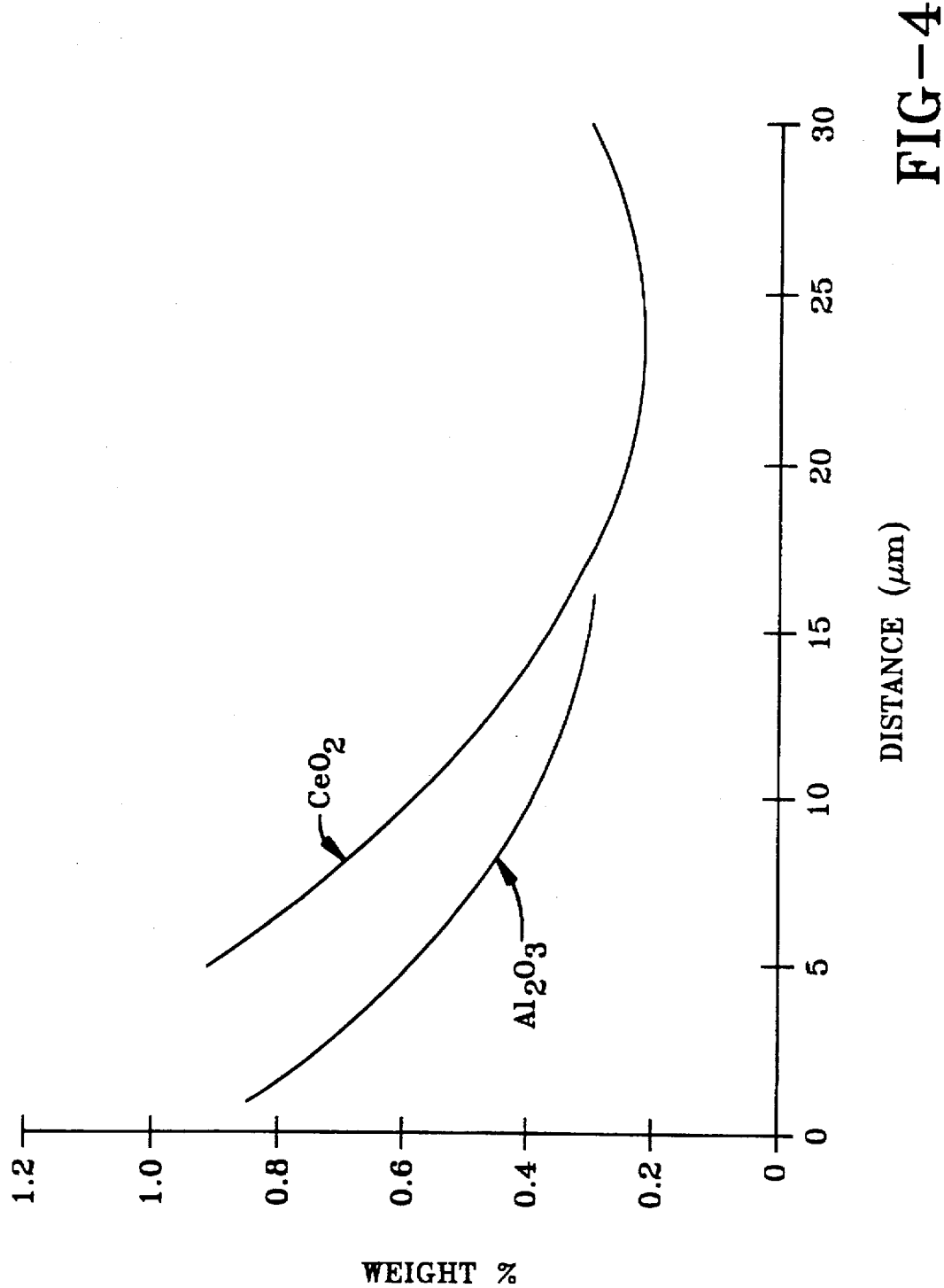
FIG. 4 illustrates a microprobe analysis at pH=7 impregnation in the thin section of the present invention.

FIGS. 3–4 illustrate a microprobe analysis at pH=7. Many more PGM's are now associated with the ceria, the microprobe shows that now the surface concentration is much higher in the corner (FIG. 3), and the surface concentration of PGM's is more consistent (but not equal) when comparing the thin section (FIG. 4) to the corner. This is because only the ceria (but not the alumina) is able to attract the metals to overcome the maldistribution of metals caused by drying as shown in the pH=2 example.

Figure 5:
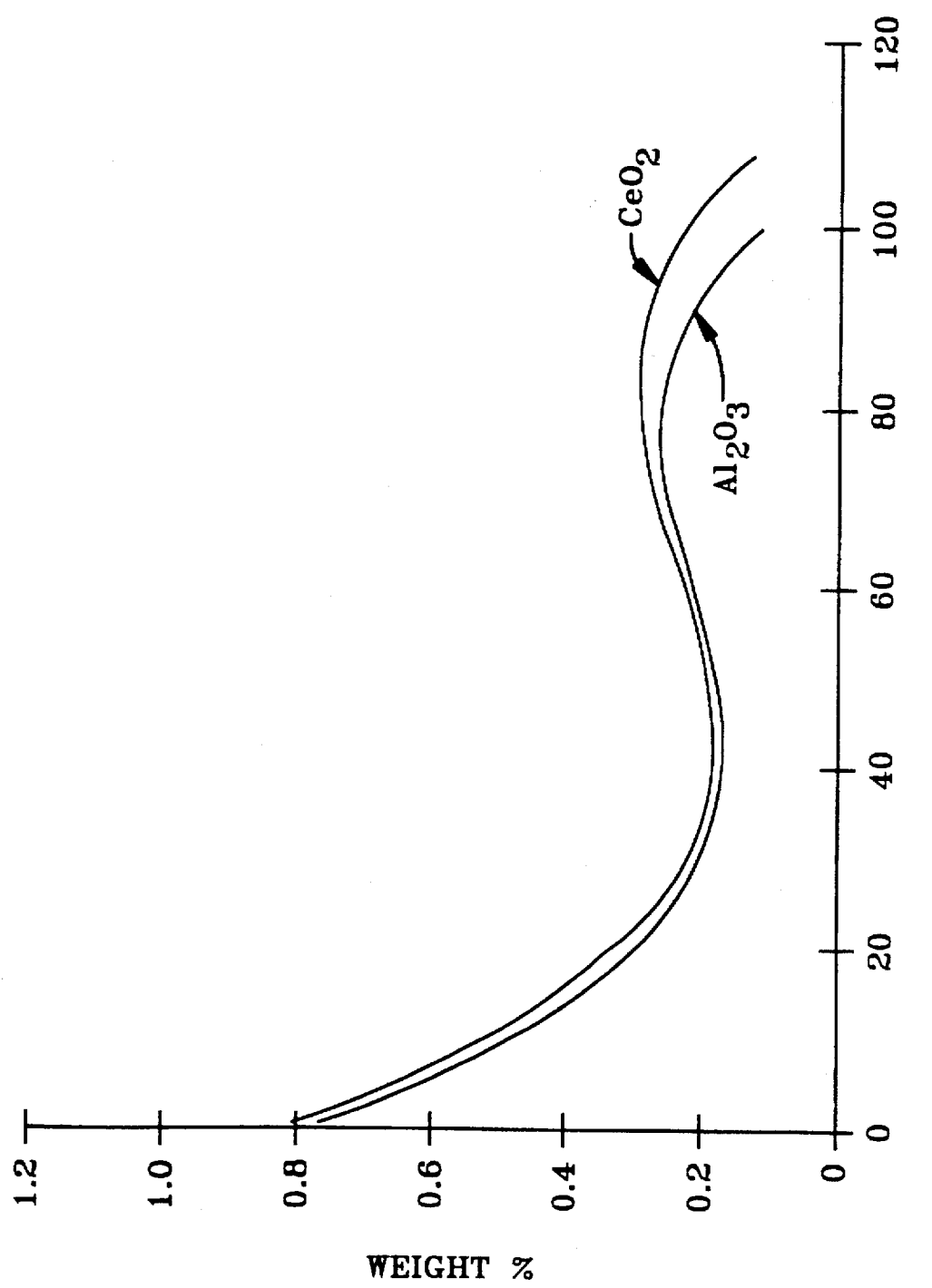
FIG. 5 illustrates a microprobe analysis at pH=10 impregnation in the cell corner of the present invention.
Figure 6:
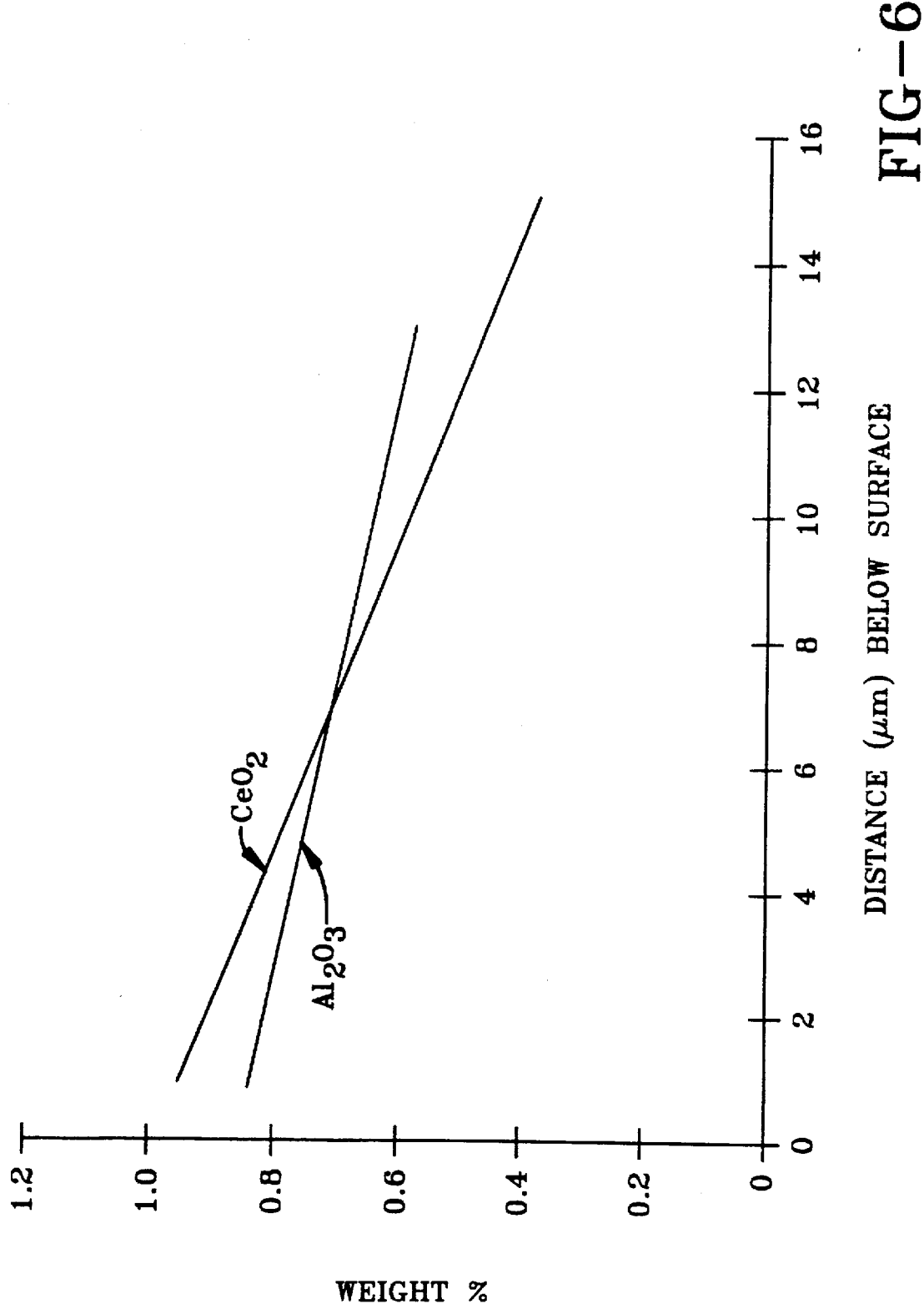
FIG. 6 illustrates a microprobe analysis at pH=10 impregnation in the thin section of the present invention.

FIGS. 5–6 illustrate a microprobe analysis at pH=10. Now both the ceria and alumina are attracting the PGM's resulting in even more highly surface concentrated distributions, relative equality of concentration between thin section (FIG. 6) and corner (FIG. 5), and a more even distribution of metals between ceria and alumina.

Table I summarizes catalyst performance on engine dynamometers showing improved aged performance results from the catalysts which were impregnated at pH=10. The normal variance for the stoichiometric sweep test is one percentage point for HC, three percentage points for CO and two percentage points for NOx. The 5–6% improvement in NOx is significant, and all other differences are within the normal variability of the test. The sweep tests were run on the same day.

TABLE I

| Monolith | Stoichiometric Sweep Conversions | | | | | | | | |
| --- | --- | --- | --- | --- | --- | --- | --- | --- | --- |
| | pH @ 2 | | | pH @ 6 | | | pH @ 10 | | |
| | HC | CO | Nox | HC | CO | Nox | HC | CO | NOx |
| 50 hr Rat A | 93 | 89 | 81 | 93 | 89 | 81 | 95 | 89 | 86 |
| 50 hr Rat A | 94 | 91 | 80 | 95 | 92 | 80 | 94 | 87 | 85 |

A preferred embodiment of the present invention was practiced as follows:

1. Wet mill nickel oxide at 47% solids for three hours.
2. Wet mill the following washcoat recipe (at 52% solids) for three hours:

532g SCFA-100 ALUMINA-gamma alumina-100 sq. m/g surface area and mean PSD of 35 microns 28 g DISPERAL ALUMINA-Boehmite 34 g NICKEL OXIDE SLURRY-Fisher Scientific NiO powder 157 g CERIUM OXIDE-Made by calcining Cerium Acetate at 425 C.

140 g CERIUM ACETATE-Crystals precipitated from solution 732 g DISTILLED $H_2O$ 5 g NITRIC ACID 3. Adjust % solids with distilled water; and adjust viscosity with nitric acid to obtain rheology for appropriate washcoat loading (e.g., washcoat with slurry at 50% solids and a viscosity of 400 cps will yield a calcined pickup of 300 g on a model 85 Australian oval).
4. Screen 1000 g of slurry through a 35 mesh screen. Use this slurry to then vacuum coat the substrate.
5. Dry and calcine (450 C) the coated substrate.
6. Post impregnate in an aqueous platinum/rhodium solution (platinum is from $Pt(NH_3)_4Cl_2$ salt with 54% Pt content by weight - rhodium is from $Rh(NH_3)_6Cl_6$ salt with 33% Rh content by weight).

Concentration of solution should be such that the amount of solution absorbed on the brick contains the appropriate precious metals loading. Typically, 0.038T.Oz. Pt/0.0038 T.Oz. Rh. The solution is adjusted to a pH of 10 prior to impregnation to obtain the preferred precious metal locations and concentration gradients, dried and calcined (425 C).

What is claimed is:

1. A method of associating precious metals with specific oxides in a mixed oxide system for use as a catalyst comprising:

providing a catalyst substrate having a washcoat thereon, wherein the washcoat comprises alumina, ceria and NiO;

impregnating platinum into the washcoat with a platinum solution at a pH ranging from 9.5 to 10.5 so that the platinum is associated with the ceria and the alumina in the washcoat and there is substantially no association of the platinum with NiO in the washcoat;

impregnating rhodium into the washcoat using a rhodium solution at a pH of 6.5 to about 7.5 so that the rhodium is associated with ceria in the washcoat and so that substantially no rhodium is associated with alumina or NiO in the washcoat.

2. A method as set forth in claim 1 wherein said platinum solution comprises $Pt(NH_3)_4Cl_2$.
3. A method as set forth in claim 1 whereia said platinum solution comprises $Pt(NH_3)_4(NO_3)_2$.
4. A method as set forth in claim 1 wherein said rhodium solution comprises $Rh(NH_3)_6Cl_3$.
5. A method as set forth in claim 1 wherein said rhodium solution comprises a rhodium amine nitrate.
6. A method of associating precious metals with specific oxides in a mixed oxide system for use as a catalyst comprising:

providing a catalyst substrate having a washcoat thereon, wherein said washcoat comprises alumina, ceria and NiO;

impregnating platinum and rhodium into said washcoat, using a platinum and rhodium solution at a pH of about 7 so that the platinum and rhodium associate with the ceria in the washcoats, there is substantially no platinum and substantially no rhodium associated with the alumina, and so that no platinum and no rhodium associates with the NiO.

7. A method as set forth in claim 6 wherein said solution comprises $Pt(NH_3)_4Cl_2$.
8. A method as set forth in claim 6 wherein said solution comprises a platinum amine nitrate.
9. A method as set forth in claim 6 wherein said solution comprises $Rh(NH_3)_6Cl_3$.
10. A method as set fort in claim 6 wherein said solution comprises a rhodium amine nitrate.

* * * * *